United States Patent
Weisenberg et al.

(10) Patent No.: US 8,468,968 B2
(45) Date of Patent: *Jun. 25, 2013

(54) METHOD AND APPARATUS FOR LINING PIPES WITH ISOCYANATE AND HYDROXYL-AMINE RESIN BASED ON CASTROL OR SOY OIL

(75) Inventors: Kent Weisenberg, Englewood, FL (US); Dudley Primeaux, II, Elgin, TX (US)

(73) Assignee: Quest Inspar LLC, Kent, WA (US)

( * ) Notice: Subject to any disclaimer, the term of this patent is extended or adjusted under 35 U.S.C. 154(b) by 213 days.

This patent is subject to a terminal disclaimer.

(21) Appl. No.: 12/847,402

(22) Filed: Jul. 30, 2010

(65) Prior Publication Data

US 2011/0244125 A1    Oct. 6, 2011

Related U.S. Application Data

(63) Continuation-in-part of application No. 12/754,104, filed on Apr. 5, 2010, now Pat. No. 7,866,277, which is a continuation of application No. 12/611,305, filed on Nov. 3, 2009, now Pat. No. 7,726,256, and a continuation of application No. 12/578,077, filed on Oct. 22, 2009, now Pat. No. 8,298,613.

(51) Int. Cl.
*B05B 13/06* (2006.01)
*B05B 3/00* (2006.01)
*B05B 3/10* (2006.01)

(52) U.S. Cl.
USPC ........... 118/306; 118/317; 118/323; 239/223; 239/224

(58) Field of Classification Search
USPC ................. 118/306, 317, 323, 316; 427/181, 427/427.2, 230–240, 427.3, 427.4; 239/223, 239/224, 703; 138/97; 405/184.1, 184.2
See application file for complete search history.

(56) References Cited

U.S. PATENT DOCUMENTS

| | | | |
|---|---|---|---|
| 2,704,873 A * | 3/1955 | Kirwan et al. | 118/694 |
| 4,337,723 A | 7/1982 | Davis | |
| 4,555,536 A | 11/1985 | Maki | |
| 4,699,964 A | 10/1987 | Kato | |
| 4,938,167 A | 7/1990 | Mizuho | |
| 5,094,909 A | 3/1992 | Tachibana | |
| 5,171,818 A | 12/1992 | Wilson | |
| 5,290,632 A | 3/1994 | Jadhav | |
| 5,346,959 A | 9/1994 | Gorman | |
| 5,405,218 A | 4/1995 | Hyde-Smith | |
| 5,688,860 A | 11/1997 | Croft | |
| 5,810,254 A | 9/1998 | Kropfield | |
| 5,879,501 A | 3/1999 | Livingston | |
| 5,913,977 A | 6/1999 | Nichols | |
| 5,925,409 A | 7/1999 | Nava | |
| 6,632,475 B1 | 10/2003 | Bleggi | |

(Continued)

*Primary Examiner* — Yewebdar Tadesse
(74) *Attorney, Agent, or Firm* — David McEwing

(57) ABSTRACT

A method and apparatus is disclosed for remotely installing in a conduit a monolithic liner comprised of an amine terminated resin and a hydroxyl resin combined with isocyanate. The hydroxyl resin may include caster oil or soy based oil. The liner mixture may include anti-static agents such as quaternary ammonium ethosulfates, ethoxylated amines or glycerol esters. The apparatus includes a main component body including an umbilical comprising hoses for lining and air components and electrical power and signals, an impingement block for mixing the liner and remotely controlled by a termination rod. The device may reciprocate forward and reverse in the pipe and the laterally. The method and apparatus can structurally reinforce the pipe to allow operation at the pipe's original maximum allowable operating pressure.

7 Claims, 7 Drawing Sheets

U.S. PATENT DOCUMENTS

| | | |
|---|---|---|
| 6,669,407 B2 | 12/2003 | Markusch |
| 6,699,324 B1 | 3/2004 | Berdin |
| 6,797,789 B2 | 9/2004 | Davis et al. |
| 6,986,813 B2 | 1/2006 | Davis |
| 7,591,901 B1 * | 9/2009 | Weisenberg ............... 118/306 |
| 2003/0172871 A1 | 9/2003 | Scherer |
| 2007/0181061 A1 | 8/2007 | Whittle |
| 2007/0185302 A1 | 8/2007 | Harasin et al. |

* cited by examiner

METHOD AND APPARATUS FOR LINING PIPES WITH ISOCYANATE AND HYDROXYL-AMINE RESIN BASED ON CASTROL OR SOY OIL

RELATED APPLICATIONS

Application Ser. No. 12/847,402 is a continuation in part application of Ser. No. 12/754,104, now U.S. Pat. No. 7,866,277, entitled "Apparatus and Method for Lining Large Diameter Pipes with an Environmentally Compatible Impervious Membrane" filed Apr. 5, 2010. Application Ser. No. 12/754,104 is a continuation of Continuation application Ser. No. 12/611,305, now U.S. Pat. No. 7,726,256, entitled "Apparatus and Method for Lining Large Diameter Pipe with an Environmentally Compatible Impervious Membrane" filed Nov. 3, 2009.

Application Ser. No. 12/754,104 is further a continuation of application Ser. No. 12/578,077, now U.S. Pat. No. 8,298,613, entitled "Apparatus and Method for Lining Large Diameter Pipe with an Environmentally Compatible Impervious Membrane", filed Oct. 22, 2009.

BACKGROUND OF INVENTION

1. Field of the Invention

With general infrastructure within the US and around the world in a precarious state of decay it has been the object of many to provide for a cost effective method to perform in situ-rehabilitation of these properties. In the industrial sector, pipe and transmission lines carrying volatile and dangerous or hazardous materials are constantly at risk of failure due to age, neglect or lack of funds to replace or repair with traditional methods. In the global municipal arena, waste collection and water distribution systems are seriously compromised with failures creating community disturbances, commercial loss and environmental incidents. The US EPA Clean Water Act of 1989 outlines mandatory restrictions and covenants imposed on municipalities to improve the conditions of their water and wastewater systems. The EPA Conference of Mayors report of 2007 surveyed 1500 US Cities' infrastructure needs resulting in $15B in needed repairs and upgrades. The RSCA has also increased scrutiny on chemical processing facilities, petrochemical facilities and pipeline transmission calling for proactive inspection and repair of millions of miles of pipe, conduit and passageway.

The conventional lining materials and methods have undesirable environmental impacts, e.g., leaching of styrene's, CFC's, VOC's and endocrine disruptors into the effluent. Diluents or solvents used in some liner formulations comprise VOC's. Effects of endocrine disruptors are believed to include growth defects and may result from relatively minor exposure to chemicals.

An additional undesirable impact results from the annulus created between the interior pipe wall and the liner. This annulus not only propagates infiltration but also exfiltration—the toxic effluents going back into the surrounding ground, ground water, lakes, streams and aquifers. The conventional resins are thermosetting resin. These resins shrink causing an annulus to form between the pipe wall and the liner. This annulus permits infiltration of ground water into the pipeline flow as well as pipeline effluent into the soil and ground water.

Generally the only reason that customers have their pipes rehabilitated is due to erosion, corrosion, cracks and leaking joints. In a method that leaves an annular space, the method only allows for the exfiltration in the future. The way this happens is that in the initial installation, the annular space between the method and the manhole or vault is sealed with mortar or some other material. At that time (after repair) it will pass a hydrostatic test but as age, corrosion, erosion and the constant pressure continue from infiltration at the manhole will work on the seal, causing the seal to begin to leak. The infiltration then gets into the effluent that is flowing through the manhole. Likewise the material flowing through the manhole can get into the annular space finding cracks and open joints therefore exfiltrating to the surrounding soils and water table around the pipe.

Footprint as defined in this disclosure pertains to other rehabilitation methods being required to have their vehicles and equipment right at the manhole/pipe access to facilitate their repair process. Due to access often times being in yards, medians, fields, woods, creeks, etc., the vehicles tear up soils, grass, remove trees, etc. Most often these methods have to excavate the manhole or vault to facilitate inserting their liners. Often times in creek or drainage culverts the contractors have to put their equipment directly in the water thereby leaking oils, fuels, etc. into the water. Also in these applications, the thermosetting resin leaches into the rivers, creeks, lakes, ponds, killing fish and organisms etc., due to inflation of the "bag" or "sock" with hot water or steam. Additionally with cured in place, (hereinafter "CIPP") and use of high density polyethylene (hereinafter "HDPE") used in slip lining, the pipe capacity is downsized so much that the rehabilitated (narrowed) pipe increases flow velocities. This results in creek scour that causes loss of stream banks, plant life and animal life. Additionally in these applications with the water infiltrating into the annular space through joints and cracks, the infiltrating water beings surrounding soils with it. In time this results in a large voids around the pipe and causing the formation of sink holes (economic as well as environmental) in roads and yards caused by soils getting into the pipe.

The present invention utilizes castrol or soy based oil within the resin composition of the liner. Castrol and soy based oils are a renewable resource. The method of the present invention does not create an impact of leaching CFC's, VOC's, or endocrine disrupters being emitted into air, water and effluent and the method does not cause a footprint due to the use of an umbilical conveying lining components, air lines and electrical supply allowing equipment to be as much as 400 feet or more from the access point of the pipe. The umbilical can traverse unlimited times around buildings, trees, etc via the use of roller quadrants. Contractors using the apparatus or method of the invention do not have to dig up or disrupt access paths as the umbilical is only 2" in diameter and can be inserted into any access.

The present invention generally relates to apparatus and methods for applying a structural reinforcing liner to the interior surfaces of pipes, conduits and passageways. The disclosure also more specifically speaks about the ability to remotely apply a consistent and continuous lining in a pipe. The liner is inert after application and does not contain and/or leach volatile organic compounds (VOC's) or chlorofluorocarbons "CFC" or hydro fluorocarbons "HCFC's" or endocrine disruptors.

2. Description of Related Art

Prior art discloses limited use of Castrol or soy based oils in lining compositions. Jadhav, U.S. Pat. No. 5,290,632 is specific to polyurethane based liners and utilizes a catalyst. It does not disclose use of amine resin based lining components nor does it disclose use of antistatic agents.

Gorman, U.S. Pat. No. 5,346,959, discloses use of ethoxylated amines in the manufacture of thermo plastic housings for electronic and medical devices. It is the cured polymer that is sought to have anti-static properties in contrast to the Applicant's invention achieving antistatic properties in the reaction mixture.

In U.S. Pat. No. 5,405,218 issued to Hyde-Smith, discloses an amine terminated prepolymer mixed with an isocyanate. In contrast, the Applicant's invention is for a liner comprising a hybrid of hydroxyl-amine resin with isocyanate.

In U.S. Pat. No. 5,810,254 issued to Kropfield discloses a low pressure, slow reacting isocyanate hydroxyl reaction of polyurethane. The lining mixture of the Applicant's disclosure is delivered under high pressure and is fast reacting. U.S. Pat. No. 5,879,501 issued to Livingston is also not a hybrid reaction mixture.

Nava, issued U.S. Pat. No. 5,925,409, is for a 3 component mixture including a diluent (solvent) that volatizes during cure. This causes the cured coating to lose density or thickness and creates volatile organic compounds (VOC's) into the pipe. The resulting lining loses strength as a structural reinforcement.

Markusch U.S. Pat. No. 6,669,407 is a polyurethane utilizing a catalyst. The reaction product is unsuitable for spraying due to the slow reaction time.

SUMMARY OF DISCLOSURE

This disclosure teaches an in situ pipe liner spay apparatus and method that allows spraying of an isocyanate and hybrid amine and hydroxyl polyol-resin mixture utilizing Castrol or soy based oil or other mixtures onto the 360° circumference of the pipe interior wall. The mixture can line the pipe walls. The lining comprises a hybrid polyurethane and polyurea structural lining. The lining is termed structural because, in addition to sealing voids and cracks in the pipe or at pipe junctures, the lining provides structural strength to the host pipe. The lining can restore the maximum allowed operating pressure of the pipe as well as reinforcement of the pipe from external buckling or longitudinal/bending strength.

The lining mixture can include anti-static agents. These agents can include quaternary ammonium ethosulfates, ethoxylated amines or glycerol esters. These agents eliminate or reduce the static buildup of lining material on the rotating disk, shafts or sprayers during the lining process. It is the rotating disk etc., that carry a static charge.

The lining components are mixed in correct proportion in the impingement block of the apparatus within the pipe. The hydroxyl resin utilizes Castrol or soy based oil. These are renewable resources. The components may be heated within the apparatus for fast reaction and curing on the pipe walls. The isocyanate amine reaction is exothermic. This heat of reaction also drives the hydroxyl isocyanate reaction. It will be appreciated that the hydroxyl isocyanate reactions frequently utilizes a catalyst. No catalyst is required by this disclosure. The reaction time is between 5 and 10 seconds, i.e., the polymer forming a solid. This avoids slumps or other undesirable variations of the lining layer. The device can apply a lining thickness of between 0.05" and in excess of 4" in a single pass of the spray assembly. The reactants fully cure within 2 to 4 hours, i.e., development of complete elastomer properties.

The apparatus includes an umbilical comprising at least one air hose, at least one electrical power cable, at least one video communication cable and lining component hoses. The umbilical or housing of the apparatus includes at least one heater for heating the lining components.

The disclosure teaches application of the lining utilizing an in situ pipe liner spray apparatus having a reciprocating capability (forward and reverse) controlled by a reciprocating head. This means the dissipation device and rotating shaft longitudinally moves back and forth relative to the apparatus (hereinafter termed "forward and reverse"). This allows the apparatus to apply multiple layers of lining to the pipe in a single pass of the spray apparatus.

In one embodiment of the device, the liner is dispersed from a conical shaped and spinning dissipation device shaped as two asymmetrical reversely aligned cones with a center top attached to a rotating shaft (extending from the apparatus rotating head) and with an acute angled flange oriented to the reciprocating head. The reciprocating head of the apparatus includes an impingement block wherein the impingement block mixes the lining components and projects the lining at a specific angle of trajectory to the spinning dissipation device. The apparatus pressurizes the liquid lining material and allows it to exit from a impingement block nozzle maintaining a near constant diameter stream prior to contacting a conical rotating dissipation device (hereinafter "dissipation device"). The surface of the dissipation device forms an acute angle to the lining stream. The dissipation device may rotate at 20,000 to 45,000 RPM at high torque of approximately 20 foot pounds.

In another embodiment, the liner is sprayed from one or more spray heads or nozzles attached to a rotating shaft. The orientation of the spray heads to the pipe wall can be remotely controlled. The rotating shaft can reciprocate or oscillate forward and reverse relative to the housing. Simultaneously, the rotating shaft may also move laterally back and forth in a pendulum motion.

The rotational direction of the dissipation device can be remotely changed from clockwise to counter clockwise. The pressures, velocities and flow rates of the lining material stream can be remotely adjusted to the apparatus via the umbilical connection.

The conical dissipation device has an inverted conically sloped surface contact area proximate to the center top for receiving the lining material stream that decelerates the pressurized stream flow inertia and evens the material dissipation into the outer flange. The dissipation device is designed to be self cleaning by its rotation function and pressurized trimming of excess material, thereby eliminating material build up. The dissipation device also allows a dwell time for material to evenly distribute inside the compounded conical geometry of the diffusion device prior to being cast onto the pipe wall. This facilitates a symmetrical lining layer on the pipe surface.

The apparatus subject of this disclosure also adds anti-static agents to the mixture within the impingement block. This impedes static charge and the resulting lining material build up.

Utilization of a shaft scraper appendage eliminates build up due to any possible static charge or material overspray residuals on the spinner shaft.

It will be appreciated that the linings may have a reaction set up time of 5 to 10 seconds, thereby allowing the application of multiple layers of lining. The apparatus subject of this embodiment of the disclosure utilizing the conical dissipation device may line pipes having interior diameters between 5.5" and 54".

This lining taught by this disclosure is benign to the environment. No annulus is created within the pipe lining. The lining material does not contain any volatile organic compounds such as solvents (diluents) or chlorofluorocarbon compounds or compounds that are endocrine disruptors. Endocrine disruptors are believed to cause growth defects and may result from relatively minor exposure to chemicals. Finally, the use of an umbilical allows the material to be delivered to the in situ pipe spray lining device without disruption to the environment proximate to the pipe access.

One must first fully appreciate the requirement for exact and precise methods and mechanical components to utilize a remote device for dispensing an ultra fast cure lining material in a pipe. Any design flaw, mechanical flaw, or controls system flaw will cause the system to fail in a matter of seconds. These failures can be catastrophic. The material being dispersed typically flash cures or gels in 4-6 seconds. It only takes an instant for the apparatus to become totally inoperable. While prior art suggest that its methods and mechanics will improve the current technology in spray lining, it does not. It is very evident that the prior art was only tested and utilized in a lab environment and never tested under real world conditions. The prior art was basically a fiction or theory authored based on evidence established in short segments of test pipe under ideal conditions. Underground pipe has no ideal conditions.

For an apparatus to be an improvement over prior art, it has to have the ability to operate for exceedingly long durations in the real world conditions such as a moist or humid atmosphere. For example, it may take over two hours to completely line a pipe segment.

SUMMARY OF DRAWINGS

FIG. 7 illustrates the end of the rotational spray head assembly.

Figure 1:
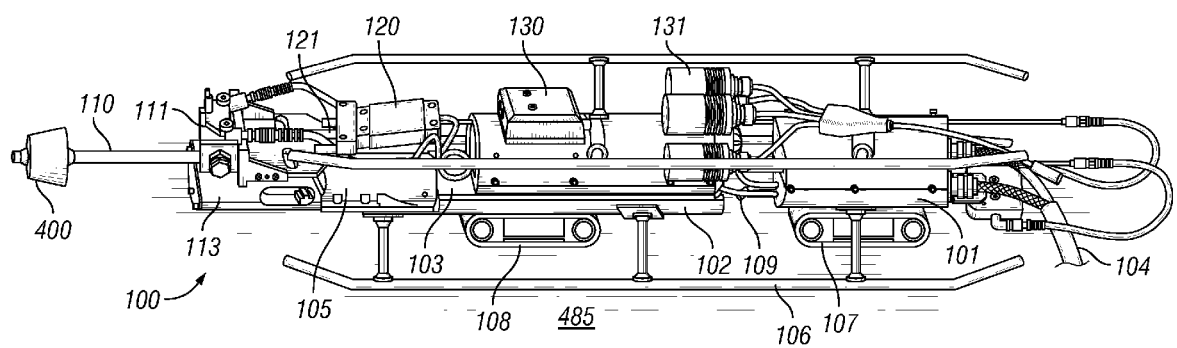
FIG. 1 illustrates an apparatus subject of this disclosure. Illustrated is the dissipation device, rotating shaft, impingement block, reciprocating head, front housing and rear housing. Also illustrated are the articulation junctures between the housings and the reciprocation head.

It will be appreciated that the foregoing drawings illustrate only two embodiments of the invention and that numerous other variations may be created within the scope of the described invention.

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

DETAILED DESCRIPTION OF DISCLOSURE

The disclosures of U.S. Pat. Nos. 7,591,901, 7,682,655 and 7,726,256 are hereby incorporated herein by reference in their entirety.

This disclosure teaches a method and apparatus that allows remote installation of liners inside pipes for distances exceeding 1,000 linear feet with only one insertion and one extraction of the apparatus. The liner spraying apparatus can comprise an articulated heated housing connected to a liner supply by umbilical hoses. The heating capability facilitates the reaction of the hydroxyl polyol and amine resin with the isocyanate. The apparatus can also be connected by hoses to an air supply and electrical wires to an electrical supply. These can power various motors or drives utilized by the spraying apparatus. The apparatus may comprise CCTV and be remotely controlled.

The liner is a reaction product of isocyanate and a mixture of hydroxyl polyol containing castor oil or soy based oil and amine resin. The hydroxyl-resin mixture and isocyanate are mixed within the apparatus in situ at high temperature and pressure immediately prior to spraying the liner on the pipe wall. The hydroxyl resin and amine resin may be pre-mixed and conveyed to the apparatus in a hose (part of an umbilical). The lining composition may be composed of at least one of amine-terminated polyetherpolyols and high functional renewable hydroxyls. Highly functional molecules have numerous reactive hydrogen sites. The lining composition may be comprised of a first component that is composed of at least one of difunctional amine-terminated polyether polyols having a molecular weight between 400 and 4000, a trifunctional amine-terminated polyether polyols having a molecular weight between 400 and 5000, an amine terminated aromatic chain extender, a multi-functional hydroxyl terminated polyol based upon a triglyceride and a hydroxyl resin utilizing Castrol or soy based oil. The second component of the lining composition may be an isocyanate component composed of at least one of an aromatic isocyanate and a quasi prepolymer of isocyante having a percent NCO between about 15 and 30 percent.

In one embodiment, the temperature of the reactants may be within the range of 140° F. to 170° F. with the ideal temperature of 155° F. The pressure of the liquid components may be between 1700 psi to 3500 psi depending upon the viscosities of the materials and the necessity for molecular cross linking. The liner is inert and free of solvents (diluants), VOC's, carbon fluorocarbons and endocrine disrupters. The cured liner is impervious to influent and effluent. Therefore a liner installed with the apparatus of the invention and the method disclosed herein will stop effluent from entering the ground and ground water.

Application of the liner is assisted by addition of anti-static agents to the hydroxyl polyol and amine resin mixture. The anti-static agent is blended into the resin compound at approximately 1% by weight with an ideal range of 0.8 to 0.9 weight percent. These agents can include quaternary ammonium ethosulfates, ethoxylated amines or glycerol esters. A preferred agent is Atmer 163, a synthetic ethoxylated amine product of Croda Polymer Additives.

The heated isocyanate and hydroxyl-amine resin mixture is mixed in an impingement block located on the apparatus. The lining mixture streams out of the impingement block onto a rapidly rotating dissipation device where the mixture briefly dwells and is spayed onto the pipe wall. In another embodiment, the lining mixture flows through a rotating shaft and is sprayed through one or more spray heads onto the pipe wall. The direction or orientation of the spray heads to the pipe wall may be remotely controlled. The dissipation device or spray heads may oscillate forward and reverse in relation to the housing. An embodiment utilizing a rotating shaft containing one or more lining spray heads may operate in a lateral pendulum motion.

The flow of the lining mixture from the impingement block is controlled by movement of a termination rod. The termination rod can stop the flow of lining mixture during operation in order that residual spray build up may be removed from the dissipation device or rotating shaft. The high speed rotation of the dissipation device makes the device self cleaning.

The disclosure teaches a liner that can restore the original predetermined maximum allowable operating pressure (MOAP) of the host pipe. The lining is a Class IV lining as defined in the Rehabilitation of Water Mains, Manual of Water Supply Practices, M28 published by the American Water Works Association, The liner may have a flexural modulus of at least 200,000 psi and flexural strength of at least 5,000 psi. The liner may have a tensile strength of at least 3,000 psi and tear strength of at least 400 pli. The thickness of the lining can be predetermined to achieve the desired lining strength.

The disclosure teaches an apparatus that by its design can be remotely inserted and retracted from all manholes and/or vaults with diameters/horizontal dimensions of approximately 18" while still achieving the lining of the entire pipe.

The apparatus may comprise an internal forward and reverse assembly, i.e., reciprocating head, rotating shaft and dissipation device, allowing it to be fully functional in small diameter pipes with bends, sags, offsets and joints. The apparatus may utilize articulated junctures separating housing sections and the reciprocating head.

FIG. 1 illustrates a prospective view of one embodiment 100 of the disclosure. Illustrated is the dissipation device 400 mounted on a rotating shaft 110. The rotating shaft extends into the reciprocating head 105 to an air turbine motor (not shown). Mounted on the top of the reciprocating head are the impingement block 111, the connected termination rod 121 and the termination rod actuator 120. The forward housing 102 extends from the articulating juncture 103 separating the reciprocating head and the forward housing. Mounted on top of the forward housing are television cameras. Mounted beneath the housing are wheels 108. Also mounted to the housing are skids 106. Separating the forward housing and the rear housing 101 is the articulating juncture 109. The articulating juncture of the housing facilitates placement of the apparatus into a pipe. Also illustrated is the umbilical 104 containing air hoses, liquid liner component hoses, television cables and electrical wires. The apparatus is shown on an interior pipe surface 485.

The apparatus may be moved at a continuous predetermined speed through the pipe. The articulating spaces between the housing segments and reciprocation head allow the apparatus to traverse around bends in the pipe or over protrusions in the bottom of the pipe. The direction of rotation of the dissipation device is reversible. This allows the dissipation to line all sides of a protrusion within the pipe interior. There are many times when there will be a lateral intrusion, e.g., a small pipe sticking into the main pipe. The maximum penetration is usually ¾". In this instance there is no way that lining can be placed on the underside of the intruding pipe or any profile without counter rotation. The dissipation device can be counter rotated either through transfer of air from exhaust to intake and reverse. More typically this is done through electronically switched bi-directional transmission or transfer case that is that is between the shaft and the motor collet. (High rpm air motors easily wear out if they are run in both directions.) The impingement block also has the ability to effectively stop and restart liner flow as required in the rotation reversing process.

The housing units may contain one or more heaters for the liquid liner components. Polyurea, the product of the mixture of isocyanate and amine resin, needs to mix between 140° F. and 170° F. to acquire the physical properties and full cure. The fluid in the apparatus lines cools quickly. In prior art applications of pipe less than 24", there was not sufficient flow through the lines to stop the product from cooling. Accordingly the qualities of the lining were poor. In the event the unit had to stop for even a few seconds the product cooled too much to start lining. This was due to viscosities becoming very rapidly thixtropic—again as it will shoot out poorly mixed product that is of "goo" consistency and will not flow. The instant application teaches heating the product continually to the point of entering the impingement block. This can include heating the hoses within the umbilical or within the apparatus housing. The hoses attach to components on the impingement block. This achieves consistent proper mixing and the ability to start and stop unlimited times as well as simply stop and let the apparatus sit in the pipe for hours and then start lining again. The temperature also affects the cure time of the mixture.

The housing unit may also comprise top mounted electric lamps to illuminate the pipe for the video cameras. This illumination can be particularly useful in large diameter pipes.

At least one video camera may be mounted on the top of the forward housing. The camera may contain built in infrared lighting to supply light for the camera. Multiplex video/control cables extend through the umbilical and may be connected to the apparatus via common friction fit electrical connections. Electrical connectors are attached to the apparatus via common threaded, braided stainless steel strain relief fittings attached to the rear housing vertical face machined borings. Once inside the lower rear housing unit, the wires are split. Wires are terminated at the solenoid for the function of the solenoid unit. Wires traverse through the rear lower housing unit in the same manner as the air lines and may be terminated in two 250V relays that are mounted in machined recesses in the forward upper housing unit. These relays work in conjunction with the air solenoid to facilitate in and out functions of the pneumatic actuator for the reciprocating head. Relays may also be connected via wires to electromagnetic sensors that are attached to the exterior of pneumatic actuators. The sensors are fully adjustable along the exterior of the actuators to adjust the stroke length of the actuator function. The stoke length may be determined by the user depending upon the application. In the case of electromagnetic rod actuators, these wires supply power and function to a programmable logic controller (PLC) and actuators.

The pneumatic or electromagnetic reciprocation actuator can be affixed in the forward lower housing unit. Actuator rods traverse through the forward lower housing unit via machined bore in the vertical face of the housing unit and are attached to rear vertical face of the reciprocation head. The reciprocation head is attached to the forward lower housing unit via steel alignment rods via threaded borings in the vertical face of the rear reciprocation head. The alignment rods extend reversely and longitudinally parallel to reciprocation head and penetrate orifices of linear bearings set in machined recesses in between upper forward housing unit and lower forward housing unit. These alignment rods maintain reciprocation head alignment during the reciprocation function. They are protected from damage by enclosure within the front housing unit and the reciprocation head.

Further, a pneumatic or electromagnetic controlled termination rod actuator is affixed to the top of the reciprocation head. As will be discussed, the rod actuator controls the termination rod which penetrates the impingement block. The impingement block mixes the liner components and projects the liner to the dissipation device extending in front of the reciprocation head.

In one embodiment, the termination rod actuator's stroke length in the pneumatic function is a set non-adjustable ⅜". The pneumatic actuator's function is controlled via electrical signal to the solenoid in the rear lower housing unit as previously discussed. The electromagnetic actuators function is controlled via the programmable logic controller (PLC).

The reciprocating head is attached to the front housing at an articulating juncture. The reciprocating head is moveable in relation to the forward housing. The reciprocating head can move along the longitudinal axis of the pipe in a forward or reverse direction in relation to the forward housing. This is sometimes referred to as an oscillating motion. In one embodiment, the head moves between 0.001 and 5 inches. The movement of the reciprocating head moves the impingement block and dissipation device in unison. The reciprocating housing moves on rods extending internally within the housing and reciprocating head. This is unlike the prior art and protects the steel rod, which provides stability to the reciprocating head, from damage. The front housing and the reciprocating head are separated by a variable space. This is sometimes referred to as the common reciprocation space. A tether may be attached to the front face of the front housing (preferably beneath the reciprocating head).

Returning to the pathway of the fluid tubing, rigid tubing is joined again with flexible high pressure hose at brackets on both sides of the reciprocating head. Flexible tubing then extends to the impingement block coupling and is joined to the impingement block. The impingement block coupling is vertically ported and machined faced to be received by the machined upper face of the impingement block. It will be appreciated that the design of this embodiment allows the reciprocation head to reciprocate at high speed while allowing high pressure fluid hoses to reciprocate at the point of the mentioned radiuses at the rear housing.

Figure 2:
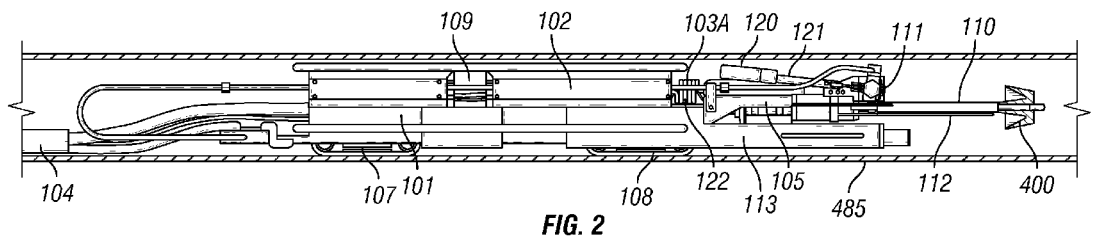
FIGS. 2 & 3 are side views of the apparatus illustrated in FIG. 1 showing the change in position of the reciprocating head to the front housing.
Figure 3:
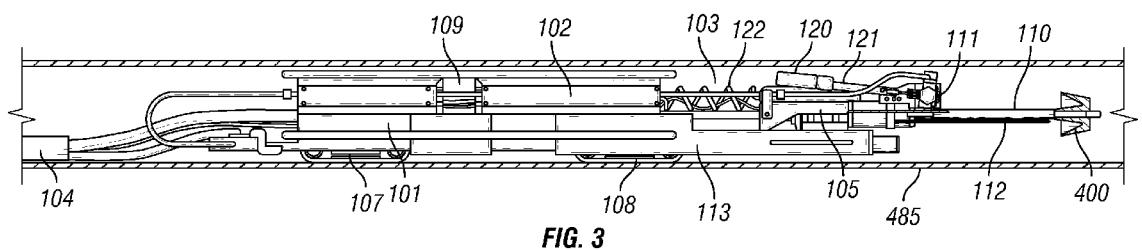
Figure 4:
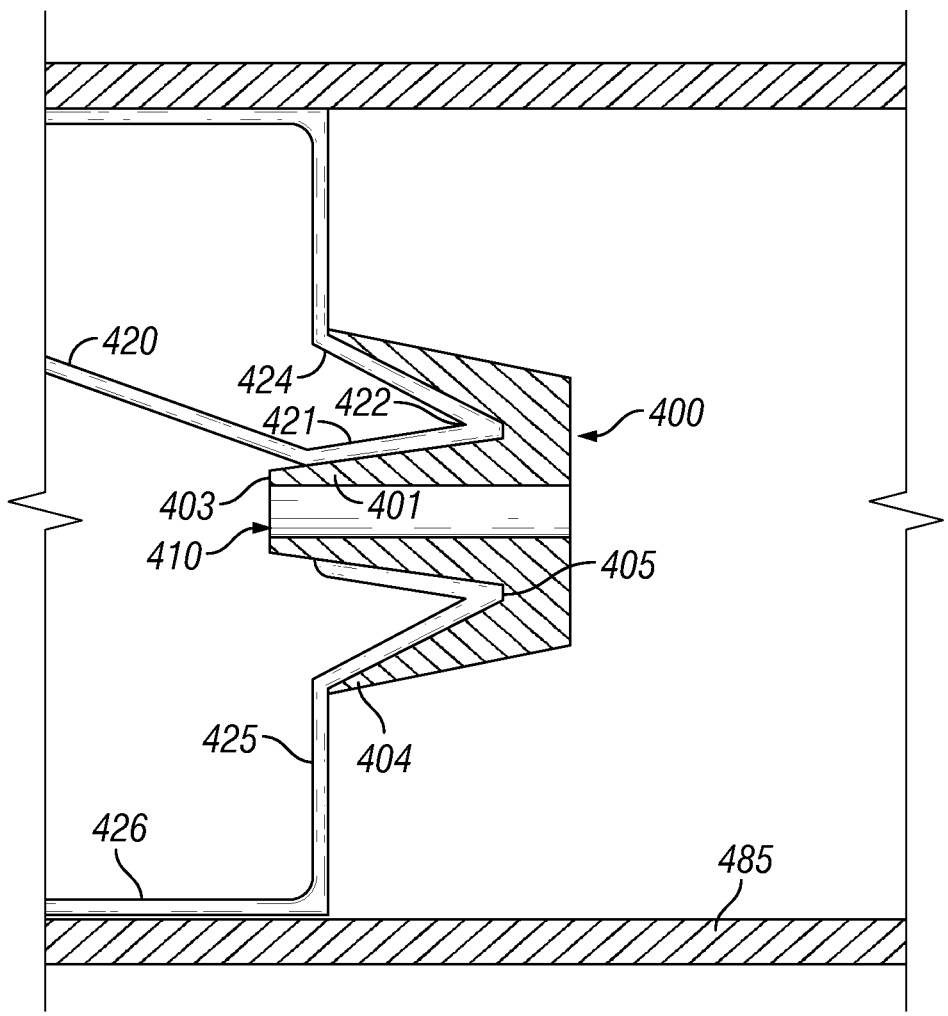
FIG. 4 is a cross sectional view of the rotating and conical shaped dissipation device showing the path of the liner on the device and off the outer device flange for lining a pipe wall.

FIGS. 2 and 3 illustrate the operation of the pre-coiled flexible air hose 122 located in the articulated juncture 103A between the forward housing 102 and the reciprocating head 105. It will be appreciated that the reciprocating head extends forward from the forward housing in FIG. 3. Also illustrated is the dissipating device 400, the rotating shaft 110, the shaft scraper 112, the impingement block 111, the termination actuator 120 and the termination rod 121. Also illustrated are the front wheels 108 and the back wheels 107, the rear housing 101, the umbilical 104 and the articulated juncture 109 between the rear housing and the forward housing. Also shown is the pipe wall 485.

The second flexible hose at the split in the rear housing unit is attached to the solenoid for air flow to the solenoid. The solenoid affords the splitting and control of four separate actuation or flow sequences. One hose from the solenoid traverses forward through the rear housing unit and is connected to a common fitting at the vertical face boring in the forward housing unit. Flexible hose is then re-established via a fitting in the articulation space between the back and front lower housing units. The flexible hose is then reattached to the back vertical face of the forward housing unit. The flexible hose is then re-established inside the forward housing unit and is connected to by common fitting and flow control valve to the "push" intake port of a pneumatic actuator that affords a reciprocation function. A second flexible hose form the exhaust port in the solenoid travels with the exact same path and design as the first hose but connects to the "pull" end of the pneumatic actuator via a common fitting and flow control valve. In pneumatic sequencing for reciprocation, the speed of reciprocation is adjustable via the flow control valves. In electromagnetic sequencing, the reciprocation speed is determined by adjustment of the programmable logic controller (PLC) via electrical current. It will be appreciated that an electromagnetic actuator does not need the air supply and is controlled via electrical current and PLC which replaces the solenoid.

The third and fourth flexible air lies from the exhaust ports of the solenoid travel with the same design and path as the air lies to the pneumatic actuator but traverse through the front lower housing unit in the same fashion as the turbine motor air supply as stated earlier. These two air lines then connect via common fitting to the "push" and the "pull" ports of the pneumatic termination rod actuator which is located and mounted on the top of the reciprocation head.

It should be noted that the pneumatic termination rod actuator is often replaced with an electromagnetic rod actuator for certain applications and is controlled with an electronic PLC in lieu of a solenoid. With both the reciprocation and termination rod functions, it is a quick retrofit to interchange these methods.

A termination rod actuator and termination rod are mounted on top of the reciprocating head. The termination rod is extendible into an impingement block. The action of the termination rod is simply one forward one reverse stroke of the rod that opens and closes the stream orifice. The heated components of the liner material come together and are mixed in an adjustable impingement module inserted into the impingement block. The module is attached to the isocyanate and hydroxyl-amine resin product feeds. In one embodiment, the isocyanate enters at the rear of the module and the hydroxyl-amine resin enters at the front of the module. The module may be adjustable by creating up to six orifices that line up with the feed orifices of the impingement block. A variation in size of the drilled orifices adjusts the amount of flow based on volume and is in direct relationship to the viscosity of the isocyanate and hydroxyl-amine resin. The module is slid over the termination rod. The module fits into the front of the impingement block. A male fitting of the module fits through the impingement block. The stream tip is pushed onto the male component of the module. A stream tip cap is then threaded on the impingement block, thereby locking the module in place. Air is supplied to the stream tip cap via a small boring in the front of the impingement block. The air is supplied to this boring via a channel that is cast in the impingement block and in which has an opening orifice on the bottom of the block. A small air line is connected to this orifice to supply air to the channel and ultimately to the spray stream cap. There may be a second threaded connector on the back side of the impingement block at the orifice. This connector comprises a threaded sealing nut with a vicon seal that compresses against the termination rod.

The termination rod penetrates through the front and back of the conical shaped module mounted within the impingement block. When the termination rod is fully extended forward, the end of the rod is seated on the back side of the stream tip to seal the liner flow. When the termination rod is retracted, the rod end passes through the drilled module orifice allowing product to flow into the module orifice and mix at high pressure. The product then streams from the stream tip to the dissipation device.

The termination rod actuators are attached to machined termination rods via machine threads. Termination rods traverse forward from the actuator connection in a slight downward and adjustable angle. The termination rod penetrates impingement block in the center preferably with a compression fitting with a kalrez seal and orifice that is attached via a threaded boring in the impingement block. The termination rod then traverses through a polymer module until it reaches a termination point at the back recessed side of a machined stream tip. The stream tips may be machined with variable sized orifices from 0.015" to 0.090" depending upon the flow needed for the particular lining application. The instant invention also has a different design of the termination rod actuator—it has a much higher pull force coupled with a function that allows for some "free" pull force momentum to build prior to actuating the termination rod. This allows the rod to brake free therefore allowing unlimited open and close cycles.

The polymer module has a ported orifice to receive the termination rod. The termination rod is self sealing due to light compression to the module surface. The module is drilled with orifices at right angle to the longitudinal orifice in the module. The orifices serve as supply ports for the lining components. A minimum of two and a maximum of six orifices are drilled into the module at right angles. These orifices facilitate the flow of both components of the lining material from a spray tip. It will be appreciated that the lining components are separated completely and maintained in separate storage containers until they impinge at high pressure and heat inside the mixing module as described above. Upon mixing in these conditions (heat and pressure), the reaction time is between 5 and 10 seconds. There is a cure of between approximately 2 to 4 hours (completion of elastomerization) depending upon the product and application criteria. In one embodiment utilizing the reaction product of isocyanate and amine resin, the product cures in approximately 5 seconds.

Upon remote activation of termination rod, the rod is partially retracted reversely out of the module orifice allowing product in grooves to enter the mixing chamber via pre drilled orifices. The product is then projected due to applied pressure through the stream tip orifice and a predetermined and adjustable angle to be received on the landing slope of the first inverted conical section of the rotating dissipation device. This landing slope is proximate to the center top of the dissipation device.

The reciprocating head also contains a high velocity and high torque air turbine motor. This motor powers a rotating shaft that extends from the front of the reciprocating head. In one embodiment, the rotating shaft is 12 inches long. In another embodiment, the rotating shaft is 6 inches long. The rotating shaft may be comprised of high density nylon, Kevlar reinforced nylon, or metal. A dissipation device is mounted on the end of the rotating shaft and at a preset distance from the impingement block. The dissipation device can rotate between 20,000 and 45,000 rpm at high torque of approximately 20 foot pounds.

Mounted on the reciprocating head adjacent to the rotating shaft is an optional shaft scraper. This long slender device removes overspray and deposits on the rotating shaft.

Static electricity entraps small quantities of the liquid liner onto surfaces of the apparatus, i.e., the rotating shaft and dissipation device. The entrapment continues until the rotating shaft and dissipation device are heavily coated and their function is interrupted. This can force shut down of the apparatus for cleaning before lining can continue. The lining mixture contains anti-static agents to prevent this.

The operation of the shaft scrapper and the anti-static agents result in continuous lining of the pipe. This lining process benefits the environment by creating a well bonded and uniform thickness pipe liner. The absence of fault minimizes the migration of effluent from the pipe.

The design of the dissipation device minimizes unintended and undesired back spray upon the lining apparatus. Prior art using an oblique or flat rotating device to disperse the lining mixture has experienced spray blocking the spray tip.

FIG. 4 illustrates the liquid liner 420 streaming from the impingement block to the dissipation device 400. The liner streams on to the center flange 401 near the center top 403. Also shown is the center annulus 410 where the rotating shaft (not shown). The liquid liner flows down the side 421 of the center flange to the pocket 422 formed at the juncture 405 of the two opposing acute sides of the dissipation device. The liner material 422 has an opportunity to dwell within the pocket 405 and where the curing process can continue. The liner material progresses up the slope of the outer flange an is pulled over the edge 404. The liner material is shown at the edge 424 and pulled 425 to the sides of the pipe wall 485 where it cures and forms and inert liner.

Continuing, the angle of trajectory of the liquid liner causes it to stream onto the interior acutely angled side of the rotating dissipation device. This is proximate to the center top of the device. The liner strikes the dissipation device at between 1700 to 3,500 psi dependant on material viscosities. The dissipation device is shaped like a letter "W". The middle portion is designated the center top. The inside portion of the bottom of the W is the pocket segment of the dissipation device wherein the liquid liner can briefly dwell and equalize its mass before being pulled over the outer flange by the operation of centrifugal force. Due to the rapid rotation of the dissipation device, the curing liquid liner sprayed from the device evenly lines the interior pipe in a 360 degree circumference.

The path of the liquid liner begins at the landing zone proximate to the center top of the rapidly rotating dissipation device. The liner material descends down the acute slope to the pocket area formed at the intersection of the interior slope and outer flange. The liner material progresses up toward the outer flange where it is thrown against the pipe wall surface. The timing of this progression is critical in consideration of the cure time of the liner. It is undesirable for the liner to cure while within the dissipation device. Also it is undesirable for the liner to be coated onto the pipe wall too long before it cures. This can result in the liner sagging or migrating from the top of the pipe. The configuration or geometry of the dissipation device may be specifically selected to address these concerns.

The dissipation device also has a self cleaning function. Small quantities of liquid liner material may migrate toward the center top. The high velocity stream from the stream orifice of the impingement block trims these quantities of liner material.

The dissipation device of the instant disclosure has the ability to counter rotate through electronically switched bi-directional transmission or transfer case that is in between the shaft and the air motor collet. The flow may be readily stop by movement of the termination rod.

In one embodiment, each housing unit is supported on skids which permit the apparatus to be pulled through the pipe during the lining operation. The skids may be made of metal. This pulling may utilize a tether attached to the front housing. In another embodiment, the height of the skids may be adjustable in order that the rotating shaft and dissipation device are proximate to the center point of the circular pipe.

In another embodiment, each housing unit includes one or more powered wheels or tracks. The direction of the apparatus, e.g., forward and backward, can be remotely controlled utilizing the lights and cameras. The tracks can be powered by air or electricity. In one embodiment, the tracks are powered by 24V gear driven servo motors that are located inside the track apparatus.

Speed of the robot apparatus is determined by a formula that takes flow/required liner thickness/pipe diameter into account. Speed is controlled remotely by a speed control that is wired to an encoder on the umbilical reel. This encoder is a 2400 bit and is connected to a program logic controller (PLC). If speed is set for example at 2 feet per minute, the encoder adjusts the reel speed automatically no matter the torque on the umbilical or diameter of umbilical on the reel. The reel will constantly pull at whatever speed determined through the formula the apparatus needs to travel at. This can be adjusted "on the fly" if a different lining thicknesses in different areas of the pipe segment. Direction or precise location of the apparatus in the pipe, while helped by the camera, is really controlled by a positioning indicator in the remotely positioned control room. The lining operation is monitored and controlled from the control room. Again an encoder sends a signal to a data display telling the operator at what foot mark he is at in the pipe.

This disclosure also includes the application of the hybrid hydroxylamine lining through an apparatus for lining large diameter pipes. The device is an automated lining apparatus for the repair of underground pipes such as chemical, sewer and circulation water pipes. The apparatus can also be used with other pipe applications including but not limited to industrial process piping. The device can spray liner upon concrete, metal or plastic pipe. The spray device is remotely operated by operators monitoring the pipe and the liner apparatus using cctv and motor controllers for the numerous device motors. Examples of these motor devices include but are not limited to the track system, the scissor leg table, angular table, rotational table, forward/reverse motor, pendulum motor, rotational motor for rotary union, cutter and creel and positioning mechanism for spray nozzle. An operator is not required to be present in the pipe or pipe access, e.g. manhole. Therefore the Applicant discloses increased safety. Surface preparation of the pipe may also be performed remotely. This is enhanced by the flexibility of the sprayer device to line all profiles or irregularities of the pipe using bi-directional (forward and reverse) oscillation and a lateral or pendulum oscillation, and the ability to apply place liner material thereby creating an arch effect.

As used herein, an arch effect is achieved with the cured liner in the upper portion of the pipe becomes self supporting by resting upon the cured liner in the lower portion of the pipe interior. The thickness of the liner necessary to achieve this arch effect can be calculated. The Applicant's disclosure permits utilization of this effect through the ability of the device to install over 4 inches of liner in a single pass. It will be appreciated that the arch effect does not require the liner to be bonded to the upper portion of the pipe. Utilization of the arch effect eliminates the need for operator entry into the pipe for cleaning, sand blasting or similar to ensure cleanliness of the wall as well as to provide an angular wall profile for the liner to bond to.

The apparatus can be track driven (self propelled) through the pipes as the liner is applied by spraying through one or more nozzle orifices. The motorized mechanism can be powered by compressed air or by electricity. The apparatus possesses the mechanical functions to be manually traversed or self propelled and requires only one access to the pipe, conduit or passageway.

The apparatus can spray pipes having diameters of 24 inches through as least as large as 174 inches. The apparatus can be centered in the varying pipe diameters. This centering can be maintained through bends in the pipe. This constant centering utilizes remotely adjustable scissor lift for vertical adjustment of the spray nozzle and a rotational table for horizontal maneuvering of the spray nozzle. The scissor lift can be powered by a ball screw-electric servo motor and a rotational shaft wherein the servo motor moves the scissor lift vertically by turning the rotational shaft for self centering the spray nozzle.

The thickness of the lining is not limited and may be completed in a single pass. The nozzle may rotate 360° covering the entire circumference of the pipe. Alternatively, the nozzle may traverse only an arc within the circumference. For example, the nozzle may spray an arc of 30° of the pipe circumference. This conserves material and facilitates rapid repair if, for example, only the bottom of the pipe requires lining as in abrasive slurry applications. Conversely, only the top of the pipe may require repair if subject to corrosive vapors.

Figure 5:
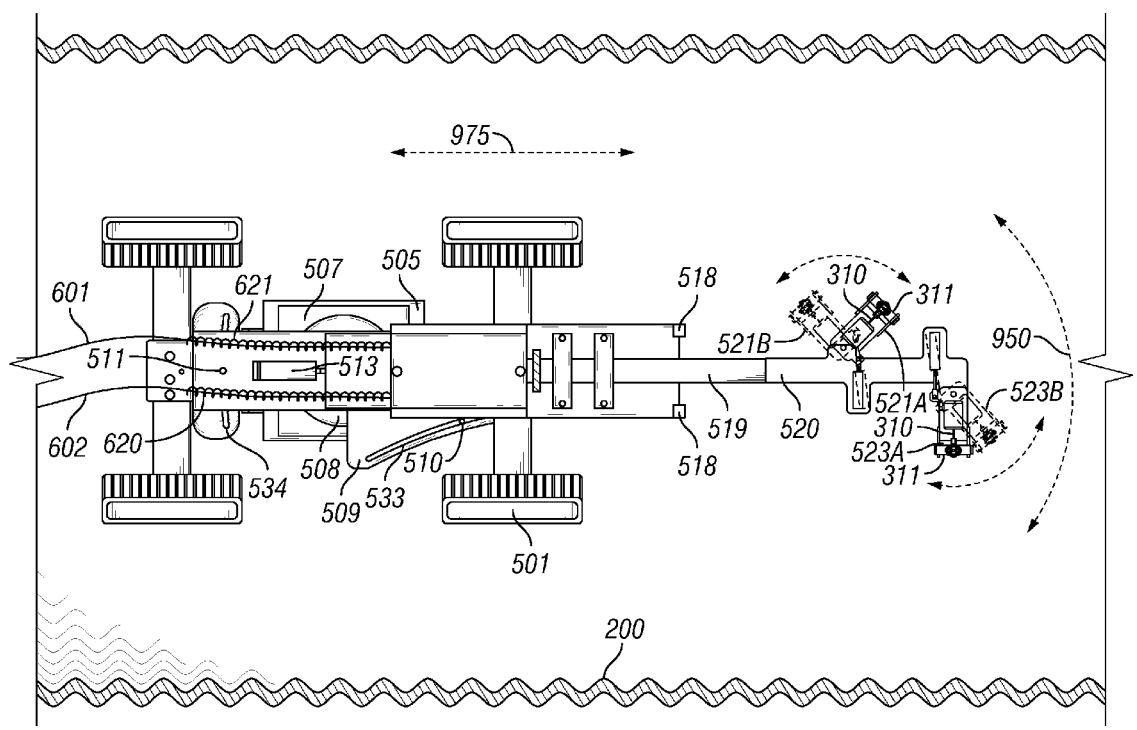
FIG. 5 illustrates a top view of a second lining apparatus. Included is the track drive system, pneumatic motor for a forward/reverse lining sprayer oscillation and the separate pendulum oscillation of the rotational shaft and nozzle, guide pins and corresponding tracks in the pendulum oscillation guide plate, and spray nozzles.
Figure 6:
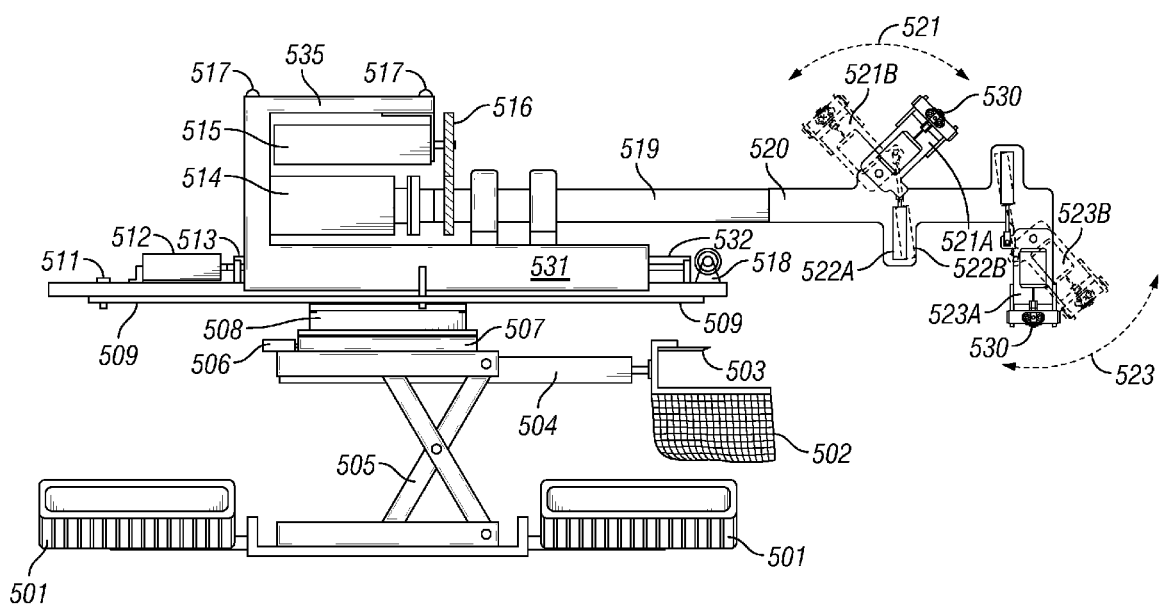
FIG. 6 illustrates a side view of the lining apparatus illustrated in FIG. 5, including the retractable creel and cleaner tip, and the two offset spray heads. Also illustrated is the scissor leg table for elevating the lining apparatus, the rotational table for centering the spray nozzles located on the rotational spray nozzle.

The device has a rotational shaft with affixed one or more spray nozzles. FIG. 5 illustrates a top view of the liner spray device. Illustrated are two spray nozzles 521A, 523A. Alternate positioning 521B, 523B of the spray nozzles are also depicted. Two spray nozzles may be utilized to increase spray volume or quantity. Two spray nozzles, positioned 180° apart, can counter-balance the other when rotated at high rpms. FIG. 5 shows the two spray heads, comprising the remotely adjustable spray nozzle and the position adjusting piston and cylinder 522 placed asymmetrically in the longitudinal direction of the rotational spray head assembly 520. This rotational spray head assembly can be automatically or manually controlled to rotate continually 360° in either direction by use of rotary unions. The rotary union 514 is located proximate to the rotational shaft 519 as depicted in FIG. 6, illustrating a side view of the liner spray device. The rotational shaft transfers rotational power to the rotational spray head assembly. The rotation is powered by a pneumatic motor 515 with variable speed and direction through gear assembly 516. See FIG. 6. The shaft can also be automatically or manually controlled to go clockwise or counter clockwise in any degree radius for spot repairs or to only line the top of a pipe or a bottom of a pipe. The spray device can be remotely controlled for any rotation cycle or set to automatically reverse direction after completion of each oscillation cycle (forward and reverse).

Figure 7:
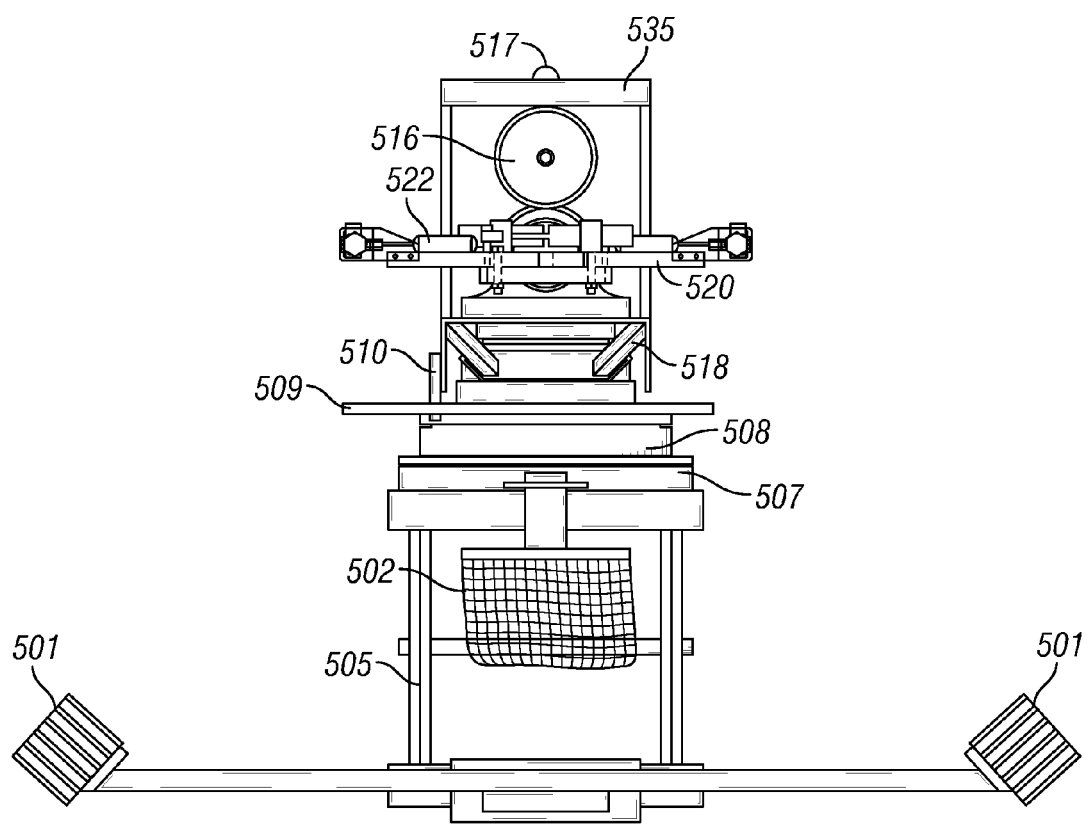
FIG. 7 illustrates a front view of the lining apparatus of FIG. 5 with the scissor lift connected to the angular table and rotary table, and guide rollers. Also illustrated are the angled powered track rollers. Also illustrated is the debris creel for catching cured liner spray from the nozzle orifice.

The liner spray device and liner spray application method utilizes oscillation of the spray nozzle in a forward/reverse motion. This motion is illustrated by Vector arrow 975 in FIG. 5. This movement is parallel to the longitudinal axis of the pipe. The longitudinal axis extends the length of the pipe. The rotational spray head assembly can be automatically controlled via remote control to change directions (clockwise and counter clockwise) after each oscillation cycle and without interruption of liner material flow. The forward/reverse motion can be controlled by an air or electric powered self reversing ball screw pushing the rotational head and rotating spray nozzle forward up to 72 inches and pulling the spray nozzle back. See FIG. 6, illustrating the rotating motor 512, self reversing ball screw 513 and guide track 532. FIG. 7, illustrating a front view of the liner spray device, illustrates guide rollers 518 and guide pin 510 controlling the forward/reverse oscillation. This oscillating motion is repeated rapidly as the device moves through the pipe. This oscillation motion may occur at up to 100 rpm. The motion facilitates an even spray lining. Also included on the oscillation bracket assembly are as many as two impingement blocks for the efficient mixing of products and electromagnetically and/or pneumatically controlled valve mechanisms for the precise remote manipulations of fluid lining flows. FIG. 7 also illustrates an end view of the rotation spray head assembly 520. It will be appreciated that the rotation spray head assembly spins around on a horizontal axis.

The methodology presented incorporates diffusion devices in conjunction with the pneumatic or intrinsically safe motor, mechanical cutter and variable and adjustable metrics to provide a conduit lining with precise application control and improved function. The apparatus includes a main self traversing component body including electromagnetic actuators, pneumatic cylinders, linear actuators relays, solenoids, pneumatic tip cleaner (cutter) and debris creel, attachment points for liner supply umbilical, cameras and diameter specific guides and a pendulum oscillation bracket. The spray device has been illustrated with adjustable nozzles that spray liner through an orifice on to the pipe wall. The spray device can also be modified to utilize a spray stream striking a rotating disk or diffusion device that throws the liner onto the pipe wall.

The device and method can utilize a second lateral or oscillating motion. This motion is referred herein as a "pendulum oscillation". This motion entails the arm, holding the spray nozzle, pivoting left to right in a radial (pendulum) manner. The rotational shaft rotates the spray nozzle 360° while the spray nozzle is simultaneously oscillated in a pendulum manner. The device may utilize a pendulum roller bracket for controlling a rotational head 535 moving in a pendulum pattern and causing the rotating spray nozzle to move from side to side while the spray nozzle shifts in orientation to the pipe wall. In the embodiment illustrated in FIG. 5, the guide pins 510, 511 of the rotational head moves in tracks 533, 534 in the pendulum oscillation guide plate 509. The design of the tracks forms the swinging movement of the rotation spray head assembly. The motion of the rotational spray head assembly 520 forms an arc 950. At each end of the arc, the orifice 530 of the spray nozzle 521A, 523A is partially pointed in the longitudinal direction of the pipe 200. This permits the liner to be sprayed on all sides of protrusions, corrugations and uneven surface profiles of the pipe or at joint/pipe interfaces. The pendulum oscillation allows the spray pattern to be perpendicular to any profile on the pipe wall regardless of the angle of the profile. The device continuously changes angles of the spray head throughout the oscillation stroke. Liner coverage may be optimized by positioning the spray nozzles in the position represented by nozzle 521B. The second spray nozzle 523A can be similarly positioned. This assures all angular profiles are aligned at the same thickness. Examples of this improved spray pattern include but are not limited to spray lining of helically corrugated pipe 200. If the spray heads were constantly perpendicular to the plane of the pipe wall, the result would be much more lining on the peaks and valleys of the corrugation and limited quantity of lining on the slopes. The pendulum motion can be combined with the linear oscillation of the rotating spray nozzles.

The spray nozzles may be remotely adjusted to create a more acute angle to the pipe wall than may be achieved with the pendulum oscillation. FIG. 6 illustrates both spray nozzles 521A and 523A in alternate positions 521B, 523B. The orifice 530 of each nozzle is also illustrated.

The spray orifice 530 can spray in a fan shaped pattern or a round-cone pattern depending upon the pipe material composition and profile. The device can spray lining in a thickness of 0.05 inches to over 4 inches in one pass.

The spray device is connected to the air supply, and the multi-part liner supply by means of a liner supply umbilical 601, 602. The umbilical can also include an electrical supply 620, 621 and control wires and cctv cables. The in situ spray liner device can be remotely controlled using cctv cameras mounted on the spray device and the control wires connected to components of the spray device. In the embodiment illustrated in FIG. 6, two cameras 517 are installed on the top of the rotational head 535.

The remote control capability of the spray liner device includes the ability to remotely start and stop the lining operation by moving the termination rod within the impingement block. This action stops the flow of liner from the impingement block. For example, the spray of liner must stop for the cutter 503 and creel component 502 to operate. The cutter and creel can be remotely controlled. The cutter and creel component may not be required with the addition of anti-static agents to the lining mixture. The remote control capability also includes the ability to stop the in situ pipe spray liner device for remedying control malfunctions or for the installation of joint sleeve applications. Joint sleeves are components that fit at the juncture between two pipes or can be utilized in areas of cracks or holes in pipe for sealing and/or structural reinforcement. This joint sleeve repair function entails numerous starts and stops of the spray liner device including rotation and oscillation.

The liner comprises a mixture of isocyanate and a hybrid amine and hydroxyl resin mixed between 140° F. and 170° F. The components may be heated 620, 621 within the spray device umbilical up through and including the impingement block. The liner components are supplied through the umbilical 601, 602 through two separate hoses. One hose conveys the isocyanate component and the second hose conveys the hybrid amine and hydroxyl resin. The second hose may convey the anti-static agents. In one embodiment the liner components are maintained apart until immediately before conveyance to the impingement block. The liner components can be separately injected into a fluid shaft 519 via a rotary union 514. See FIG. 6. They are then conveyed to be mixed in an impingement block located in the oscillation bracket assembly and then dissipated through the spray orifice 530 of nozzles 521A, 523A. The flow, velocity and pressure of the liner material can be remotely controlled in the impingement block. The flow is controlled by positioning of a termination rod. The lines can be remotely cleared with high pressure air or other fluid. The impingement block can be located between the rotary union 514 and the fluid shaft 519. In one embodiment, the fluid shaft contains multiple longitudinally bored holes. Liner components are conveyed separately through the fluid shaft at high pressure. The mixed components (mixed in the impingement block) rapidly cure, e.g., 5 seconds. Once the mixture cures, the liner is inert.

The device may utilize remote controlled self propulsion. The device is illustrated with 4 drive tracks 501. This system may be used to insert and to retract the device from the pipe. The liner supply umbilical may also be used for retracting the device from the pipe. The device requires only one access port into the pipe.

A prior art spraying apparatus traversing over a profile of as little as 0.50" at one end of the apparatus can be compounded to as much as 2 inches at the other end. This results in a dramatic increase or a dramatic decrease in liner thickness in the radial areas during traversing over the profile. With the prior art devices, design calculations for soil load and or pressure containment are of little merit as the contractor cannot assure the client of consistent liner thickness. Current art is antiquated when it comes to maintaining proper shaft/dissipation device alignment in the center of any diameter. This is another reason for contractors being unable to predict liner thickness. Current art relies on fixed non adjusting shafting between carriage and dissipation devices which in turn relays any offset in the pipe to the dissipation device action.

The Applicant's spray device also incorporates mechanical components that allow accurate vertical and horizontal positioning of the spray head. See FIG. 6. These mechanical components include but are not limited to a scissor table 505 vertically centering the rotational spray head assembly 520 via proximity sensors or gyroscope. The spray nozzle 521, 523 is horizontally centered using the rotational table 508. The rotational table is adjustable to 90° in either horizontal direction of the centerline. This assures consistent liner thickness circumferentially through up to 90° bends and also straight run applications. The rotational table is a geared table that is driven by an electric motor or pneumatic motor. It is operated remotely via cctv camera by the operator when traversing through bends. The spray device also includes an adjustable angular table 507 with a pneumatic motor 506. The forward edge of the table can be elevated to a 45° angle to the back table edge. This movement elevates the spray head assembly and the fluid shaft in communication with the rotary union.

The in situ pipe spray liner also includes a component further comprising the ball screw-electric servo motor that can line pipe, conduits, structures and passageways from horizontal through varying degrees to fully vertical. All fully vertical pipe is lined by traversing the robot reversely or in an upward path in the pipe segment. The shaft is then centered remotely just as it is in a horizontal pipe.

Correct alignment allows consistent liner thickness circumferentially. The device utilizes a scissor lift 505 to control height of the spray nozzle head assembly 520. Proximity sensors are attached proximate to the rotating shaft. The sensors send signals to limit switches/relays that operate the rotary screw drive motor that operates the vertical scissor lift. When prior art devices traverse over any offset or large profile in the pipe, the extended nozzle head assembly device is dramatically affected. The nozzle head assembly device moves closer to some portions of the pipe wall and more distant from other portions.

The Applicant's spray device can be equipped with two spray heads 521A, 523A. Both spray heads may be simultaneously used depending upon the pipe diameter and the required liner thickness. The device has the capability to line both horizontal and vertical pipes. Each spray nozzle can be remotely controlled. The orientation of the spray nozzle to the pipe wall can be adjusted using a piston and cylinder arrangement 522. Alternate nozzle positions are illustrated 521B, 523B. The cylinder controlling the spray nozzle can pivot. See the variable positions illustrated 522A, 522B. Each spray nozzle is installed in the rotational spray head assembly 520. It will be appreciated that the two nozzles are installed asymmetrically along the length of the spray head assembly. Examples of variable positions of each spray nozzle are also illustrated for the second spray nozzle 523A, 523B.

The 5 fluid port and 3 disc electrical rotary union 514 allows fluids to pass from affixed ports to the rotating shaft 519. Fluid hoses are connected to one side of the union. The fluid then passes through an interior shaft in the union that is individually ported. Passageways and seal systems allow the union to transmit fluids while the rotating shaft (connected by machined coupling at the other end of the union) is rotating.

The motor 515 is mounted above the rotary union 514 (see FIG. 6) at the rotational head 535 and communicates only to the rotational shaft through a gear drive 516. The rotating shaft may be configured to convey fluid and for conveyance of electrical power. When the union is connected to the shaft via coupling, it becomes basically an extension of the shaft. The back of the union is bolted to a plate to keep the union's casing from being able to rotate. Only the interior shaft of the union rotates. The segmented casing on the outside where the hoses are affixed does not rotate.

The rotational shaft and head are connected to a carriage 531. This carriage is what oscillates forward and reverse as illustrated in Vector arrow 975. Everything mounted to that carriage moves when oscillating extension and retraction take place. This includes the rotational spray head assembly 520 with the adjustable spray nozzles 521, 523. Also included is the pneumatic motor with adjustable speed and direction 515. The forward and reverse motion is powered by a pneumatic or electrical motor 512 coupled to a self reversing ball screw drive 513 and rotational shaft 532.

In another embodiment, the spray device may be operated without bi-directional (forward and reverse) oscillation or without pendulum oscillation. This embodiment could be used after extensive surface preparation of the pipe interior to allow application of thin mil system, i.e., liner 15 to 60 mils thick.

Figure 8:
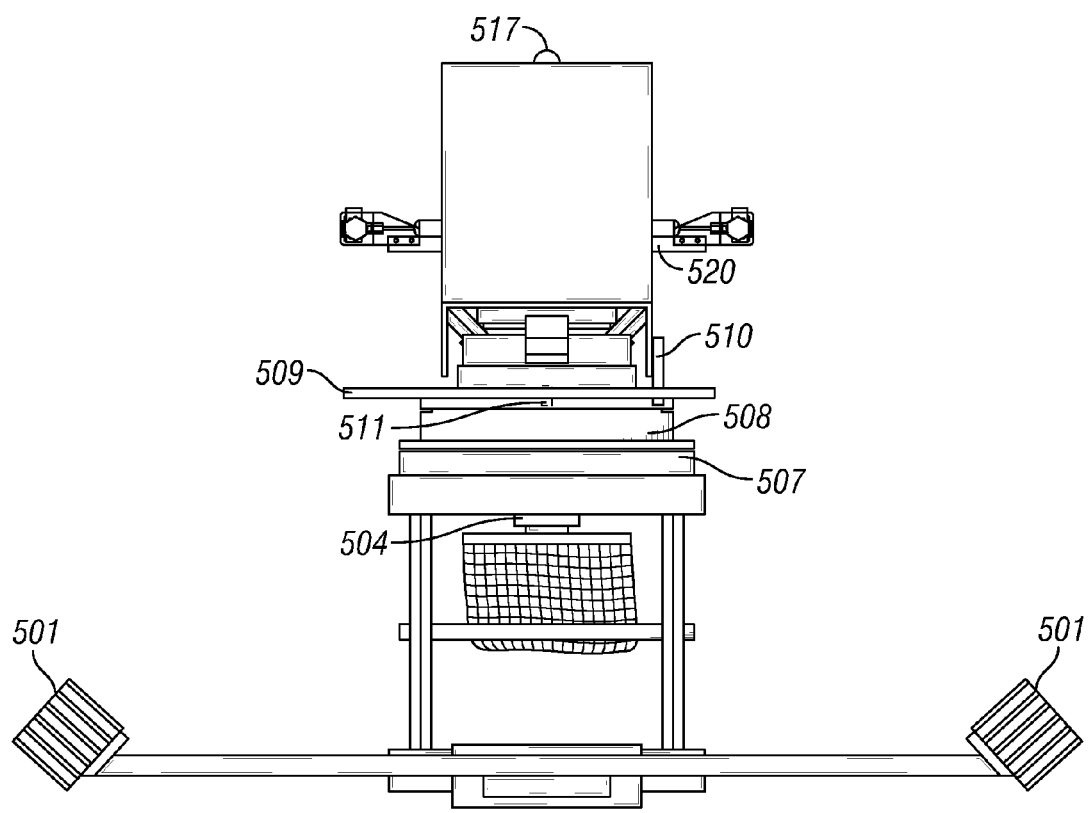
FIG. 8 illustrates a rear view of the lining apparatus illustrating the angular table and the rotary table. Also illustrated is the pendulum guide plate and guide pins.

The in situ pipe spray liner device comprising the ball screw-electric servo motor can line pipe, conduits and structures. All fully vertical pipe is lined by traversing the robot reversely or in an upward path in the pipe segment. The shaft is then centered remotely just as it is in a horizontal pipe. FIG. 8 illustrates a back view of the apparatus showing the camera 517, the spray nozzle assembly 520, guide pins 510, 511, guide plate 509, rotational table 508 and angular table 507 and rotating tracks 501.

This specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention may be utilized independently of the use of other features, all as would be apparent to one skilled in the art after having the benefit of this description of the invention.

While specific embodiments have been illustrated and described, numerous modifications are possible without departing from the spirit of the invention, and the scope of protection is only limited by the scope of the accompanying claims.

What we claim are:

1. A remotely operated spray lining device for lining the inside of a pipe comprising:
    a) umbilical hose attachments for two or more umbilical hoses;
    b) air supply hose attachment or electrical power attachment;
    c) a heater;
    d) an impingement block;

e) a liner mixture of an amine-terminated polyol, a high functional hydroxyl resin based upon castor oil or soy based oil and isocyanate resin;
f) a remotely operated termination rod controlling a flow of the liner mixture from the impingement block; and
g) a dispersion component that sprays the liner up to 360° circumference onto the pipe wall.

2. The device of claim 1 further comprising the liner mixture including an anti static agent.

3. The device of claim 2 wherein the anti static agent is quaternary ammonium ethosulfates, ethoxylated amines or glycerol esters.

4. The device of claim 1 wherein the dispersion component comprises at least one rotating nozzle wherein the angle of the nozzle to the pipe wall can be remotely adjusted.

5. The device of claim 4 further comprising the nozzle moving in a forward and back motion in relation to the device.

6. The device of claim 4 further comprising the nozzle moving in a lateral motion in relation to the device.

7. The device of claim 1 further comprising the dispersion component comprising two nonreciprocal inversely mounted rotating cones.

\* \* \* \* \*